United States Patent [19]

Reed et al.

[11] 4,016,952
[45] Apr. 12, 1977

[54] MARINE GAS EXPLODER

[75] Inventors: Dale H. Reed, Dallas; Jack E. Hardison, Garland, both of Tex.

[73] Assignee: Atlantic Richfield Company, Los Angeles, Calif.

[22] Filed: Oct. 6, 1975

[21] Appl. No.: 619,927

[52] U.S. Cl. .............................. 181/118; 181/110; 181/116; 340/12 SD; 340/17 R

[51] Int. Cl.² ................... G01V 1/38; H04B 13/00; G01V 1/02

[58] Field of Search .......... 181/110, 116, 117, 118, 181/120, 142, 402; 29/594; 340/8 FT, 9, 7, 12 SD, 17

[56] References Cited

UNITED STATES PATENTS

| | | | |
|---|---|---|---|
| 3,277,437 | 10/1966 | Bouyoucos | 340/12 R |
| 3,406,778 | 10/1968 | Barry et al. | 181/118 |
| 3,545,563 | 12/1970 | Cholet | 181/118 |
| 3,741,333 | 6/1973 | Moniz et al. | 340/17 |
| 3,919,684 | 11/1975 | Reed | 181/118 |
| 3,952,833 | 4/1976 | Reed et al. | 181/118 |
| R26,748 | 12/1969 | Schempf | 181/120 |

*Primary Examiner*—Nelson Moskowitz
*Attorney, Agent, or Firm*—Robert M. Betz

[57] ABSTRACT

A pair of movable pistons are separated within an enclosed, submerged cylinder by an expansible combustion chamber. Piston rods extend from these pistons through the opposite ends of the cylinder. A pair of dish-shaped, circular plates are carried on the respective extremities of these two rods so that their convex surfaces face inwardly toward the ends of the cylinder in spaced relation. Expansion of an explosive gas mixture within the combustion chamber drives the pistons apart so as to accelerate the plates through the water, producing cavitation bubbles at their convex surfaces. Collapse of these bubbles combines efficiently to produce a single energetic acoustic pulse adapted for seismic prospecting.

8 Claims, 6 Drawing Figures

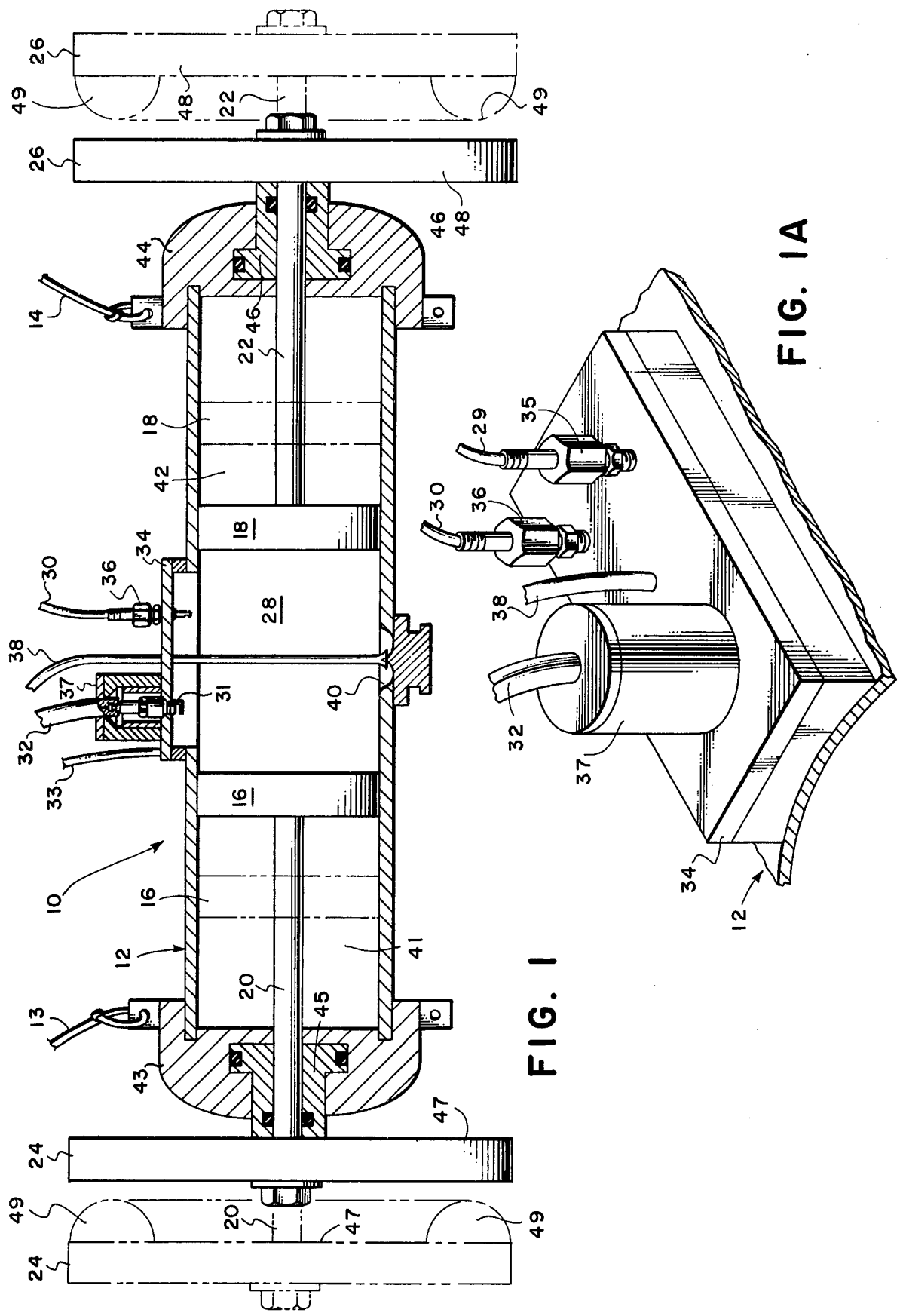

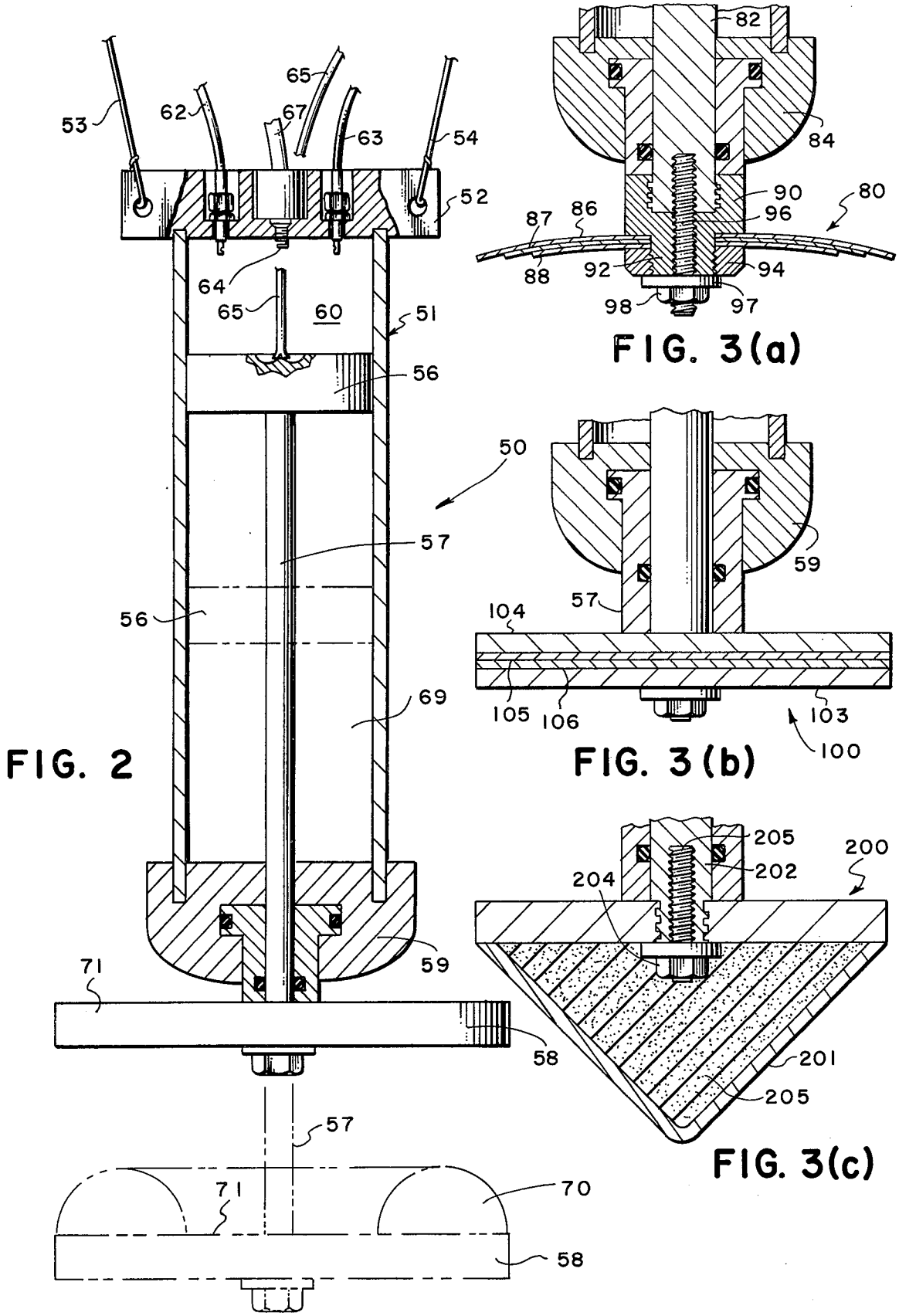

MARINE GAS EXPLODER

BACKGROUND OF THE INVENTION

1. Field of the Invention

This invention relates generally to a method and apparatus for producing underwater acoustic seismic signals. More particularly, it is concerned with a marine gas exploder of the type which achieves its results by generating cavitation bubbles whose collapse produces such signals.

2. Description of the Prior Art

Prior art devices of the character described typically involve the rapid separation of a pair of opposed, flat plates exposed to a body of water in a direction normal to their plane surfaces. Photographic studies reveal that when the plates are moved in opposite directions cavitation occurs adjacent both facing surfaces. The size of the two cavitation bubbles invariably differs and consequently there is a finite time separating the signals resulting from their collapse. If one of the plates is held fast, cavitation appears to occur almost exclusively at the surface of the moving plate. The Applicants have therefore surmised that existing devices of this character could be rendered more efficient by completely eliminating one of the two opposed plates and simply moving a single plate surrounded by water on all sides. Experiment verifies that this is correct. This construction also makes it possible to vary the configuration and dimensions of the plate without essentially modifying the driving mechanism. These plate characteristics significantly affect the energy content of the collapsing cavitation bubble and the acoustic signal strength which can be obtained. By contrast, in typical prior art piston and cylinder arrangements for rapidly separating opposed plates, modification of the dimensions and contour of these plates would involve substantial redesign of the entire device.

The Applicants also learned that a plate accelerated by a marine gas exploder is subjected to severe bending forces in the direction of motion, due either to sudden deceleration at the end of its forward travel or because of the non-uniform pressure distribution on its trailing surface produced by the collapsing cavitation bubble. These forces are severe enough to cause cracks or complete failure if low strength, non-resilient materials are used in plate construction.

It is therefore a general object of this invention to provide an improved method and apparatus for generating a marine seismic signal.

It is a further and more specific object of this invention to provide a method and apparatus of this character which which produces such signal through the collapse of the cavitation bubble adjacent a moving plate.

It is yet another object of this invention to provide such a method and apparatus which provide for maximum energy utilization in the formation of such a cavitation bubble.

It is a still further object of this invention to provide such a method and apparatus wherein variations in the energy content of the resultant cavitation bubble are facilitated.

Other objects and advantages of this invention will become apparent from a consideration of the detailed description to follow taken in conjunction with the drawings and as more particularly set out in the appended claims.

SUMMARY of the INVENTION

In a preferred embodiment of this invention, a marine gas exploder, supported so that it is completely submerged in water, consists essentially of an outer enclosed cylinder with its axis extending horizontally, a pair of movable pistons within the cylinder separated by a central expansible combustion chamber, a pair of piston rods extending respectively from said pistons through the opposite ends of the cylinder to interconnect with a pair of external annular plates surrounded by water and facing such opposite ends in spaced relation, means for introducing and detonating a pressurized explosive gas mixture within the combustion chamber and means for expelling the resultant combustion products. When the device fires, the pistons are driven apart so as to accelerate the annular plates through the water in opposite directions. In consequence, cavitation bubbles are generated adjacent their trailing surfaces. The collapse of these bubbles produces a single energetic acoustic pulse.

In one embodiment of this invention, the annular plates are dish-shaped, of diameter significantly greater than that of the cylinder, and oriented so that their respective convex surfaces face the opposite ends of the submerged cylinder. The bubbles are essentially ring-shaped and coincide with the periphery of the plates.

BRIEF DESCRIPTION OF THE DRAWINGS

FIG. 1 is a view in longitudinal section of an improved marine gas exploder in accordance with this invention.

FIG. 1a is a diagrammatic plan view of the combined fuel injection and ignition installation for the marine gas exploder of FIG. 1.

FIG. 2 is a view in longitudinal section of an improved marine gas exploder in accordance with an alternate embodiment of this invention.

FIGS. 3a, b and c present detailed sectional views of alternate forms of the external plates shown in FIGS. 1 and 2.

DESCRIPTION OF THE PREFERRED EMBODIMENTS

Referring now to FIGS. 1 and 1a, a marine gas exploder 10 includes an enclosed cylinder 12, submerged in water and supported at opposite ends by suitable cables 13 and 14 from a stationary or movable support (not shown) such as a float which may carry the customary controls, electrical power, and fuel supply equipment for such a device well known in the art. A pair of similar pistons 16 and 18 are adapted to move in opposite directions within the cylinder 12. Pistons 16 and 18 are connected respectively by piston rods 20 and 22 to external annular plates 24 and 26 adjacent the two ends of cylinder 12. The space between the pistons 16 and 18 within the cylinder 12 forms a combustion chamber 28 which may be charged with an explosive gas mixture under suitable pressure to drive the pistons 16 and 18. This explosive gas mixture may consist, for example, of separate streams of oxygen and propane introduced through tubes 29 and 30 respectively. Ignition of the explosive gas mixture in chamber 28 is accomplished by means of a conventional spark plug 31 connected to a source of voltage through insulated cables 32 and 33. As best seen in FIG. 1a, a mounting plate 34 positioned over an aperture in the upper wall of cylinder 12 supports a pair of gas tube holders 35 and 36 through which tubes 29 and 30 respectively communicate with the interior of chamber 28. Spark plug 31 is in like manner retained in a holder 37 secured to mounting plate 34. The details of the combined fuel injection and spark plug installation for gas exploder 10 form part of a separate invention and are covered in commonly assigned co-pending application Ser. No. 619,928, entitled METHOD AND APPARATUS FOR PREVENTING MISFIRES IN A MARINE GAS EXPLODER, filed in the names of Alpheus A. Franklin and Jack E. Hardison.

An exhaust tube 38 which may be either of the closed or open type extends through mounting plate 34 into the chamber 28 to enable the expulsion or purging of gaseous combustion products. Since the exploder 10 is subjected to constant cooling by the surrounding body of water, part of the water formed in the combustion process will condense. Unless periodically removed, this condensate accumulates and decreases the effective volume of chamber 28 and in turn the energy of the explosion produced therein. In order to remove this condensate, a sump 40 is formed within the wall of the cylinder 12 at the bottom of the combustion chamber 28. Condensed water vapor will collect by gravity flow within the sump 40 and will be entrained in any spent combustion gases flowing from the chamber 28 into the lower end of the exhaust tube 38 which extends within the sump 40. The details of this apparatus for condensation removal form part of a separate invention and are set forth in commonly assigned co-pending application Ser. No. 619,926, entitled APPARATUS FOR REMOVAL OF CONDENSATION FROM A MARINE GAS EXPLODER.

In operation, ignition of the gas mixture within chamber 28 drives the pistons 16 and 18 oppositely against the counter pressure of air springs 41 and 42 to accelerate the plates 24 and 26 through the water at a rate sufficient to induce cavitation behind such plates. Collapse of such cavitation bubbles with approximate simultaneity produces an acoustic signal of desired magnitude which may be used for seismic or other purposes. The balanced reaction forces of the pistons 16 and 18 eliminate the need for any heavy supporting float in order to hold the exploder 10 substantially stationary.

The plates 24 and 26, which may be constructed, for example, of steel or aluminum, are suitably fixed to the extremities of piston rods 20 and 22 and spaced from respective cylinder end caps 43 and 44 by means of brass bushing 45 and 46 secured therein. It is significant that prior to ignition of the exploder 10 plates 24 and 26, in their initially retracted positions, are substantially surrounded by water on all sides except for that portion of their trailing surfaces 47 and 48 abutting the bushings 45 and 46 respectively. When the plates 24 and 26 are accelerated in opposite directions to their moved positions shown in dotted outline, underwater photographs reveal that cavitation occurs at the trailing surfaces 47 and 48 in the form of a ring or torus 49, having an outer diameter at least as large as the periphery of each plate. The collapse of thse toroidal cavitation bubbles 49 produces the acoustic or seismic signal of interest. No detectable cavitation appears to occur adjacent the surfaces of end caps 43 and 44 because cylinder 12 remains essentially stationary in the water.

Since the operation of this invention does not involve the separation of opposed flat plates or other surfaces, there is no necessary relationship between the diameter of the plates 24 and 26 and that of the cylinder 12. For example, an efficient design for exploder 10 may consist of a cylinder 12 of a diameter of six inches while the plates 24 and 26 may be circular and given a diameter of twelve to sixteen inches in order to increase the size of the cavitation bubbles produced thereby and the consequent peak strength of the resultant acoustic signal. As the plate diameter increases, the fill time of the explosive mixture introduced within the combustion chamber 28 will have to be correspondingly increased to provide explosive energy to develop the necessary acceleration. An advantage, however, of increasing the diameter of the plates 24 and 26 is to resist the spring rebound effect of air springs 41 and 42 to a greater extent than would plates of smaller diameter, thus damping undesirable oscillation. Further, the contour of the plates 24 and 26 need not conform to that of the end caps 43 and 44. Thus, any of a variety of plates of differing dimensions and contour can readily be affixed to the ends of the rods 20 and 22 without any alteration in other features of the exploder 10.

Turning now to the alternate embodiment of FIG. 2, there is shown a marine gas exploder 50 in accordance with this invention consisting generally of an outer vertically oriented cylinder 51 supported from its upper end plate 52 by means of cables 53 and 54 suitably suspended similarly to exploder 10. The piston 56 is interconnected by means of a rod 57 with an external plate 58 adjacent and spaced from the lower end cap 59 of the cylinder 51. The space within cylinder 51 above the piston 56 forms a combustion chamber 60. Separate streams of propane and oxygen may be introduced within combustion chamber 60 through flexible fill lines 62 and 63. The electrodes of a spark plug device 64 supplied with power through lead 67 are conveniently situated so that they are exposed to the interior of the chamber 60. In order to vent, purge or otherwise expel spent combustion gas from the chamber 60, an exhaust tube 65 is introduced downwardly through the end 52 into the chamber 60.

The operation of the exploder 50 is similar to that of the exploder 10 with the exception that only one external plate 58 is employed. Upon firing, the plate 58 is accelerated downwardly at a rapid rate against the counter-pressure of an air spring 69, reaching the position shown in dotted outline. In this embodiment, it is convenient to illustrate the formation of a cavitation bubble 70 of generally toroidal shape adjacent the upper or trailing surface 71 of the plate 58. It is hypothesized that because of its toroidal shape the collapse of the bubble 70 is accompanied by a relatively greater force on the periphery of the plate 58 than upon portions thereof closer to its central axis. Experimental firing of the exploder 50 with plates 58 of varying dimensions and strengths suggests that severe bending forces are exerted in the direction of acceleration. This hypothesis has led in part to the adoption of alternate forms for the acoustic plates of this invention as will now be discussed.

In FIG. 3a, there is illustrated a plate 80 of laminar construction supported at the end of a piston rod 82 extending through the lower end cap 84 of the cylinder of a gas exploder similar to the exploder 10 or 50. It will be understood in what follows that the description and operation of this embodiment of the invention is equally applicable to single or dual plate versions and in either vertical or horizontal orientation.

The plate 80 may consist conveniently of a plurality of curved circular segments such as segments 86, 87 and 88 of thin, high strength spring steel. In order to secure the plate 80 to the end of the rod 82, an adapter 90 is square-threaded to its lower end and provided with a shank portion 92 of reduced diameter over which the segmented plate 80 fits and is thereafter clamped in place by means of threaded nut 94. The lower end of the rod 82 is also tapped to receive a threaded stud 96 extending through the adapter 90 so as to accommodate a washer 97 and jam nut 98 to complete the plate assembly.

The purpose of the laminar or segmented construction of the plate 80 is to provide a degree of resilience or spring action which will allow the periphery of the plate 80 to flex in the direction of travel without breaking. In this way, the entire plate 80 may be made thinner than would otherwise be permissible in order to withstand the considerable stresses generated in the firing of high energy underwater devices of this character.

The Applicants have determined suprisingly that by curving at least the periphery of the plate 80 in the direction of its forward motion that the peak amplitude of an acoustic signal produced thereby is substantially enhanced. Since this increases the hydrodynamic drag, it might be supposed that acceleration would be lessened and the size of the resultant cavitation bubble would be decreased. It develops, however, that the shape of plate 80 contributes to the formation of a larger cavitation bubble. The degree of curvature of the plate 80 appears to be primarily significant along the convex surface 99 of the upper or rear most segment 86. For example, bowing the periphery of the plate 80 forward a distance of approximately one-tenth its diameter gives good results. As compared to a flat plate of similar weight and dimensions, the plate 80 so configured very nearly doubles the peak acoustic signal strength obtainable. While an upper limit to the acceptable degree of this curvature has not been determined, it seems reasonable that one exists.

Another alternate embodiment of the acoustic plate employed in this invention is shown in FIG. 3b. The laminar flat plate 100 is threaded onto the lower end of the shaft 57 of a vertically oriented exploder of the type shown in FIG. 2. The plate 100, for example of lightweight aluminum, may consist of a pair of thicker leading and trailing laminations 103 and 104 and a thinner pair of intermediate laminations 105 and 106. In operation, this laminar construction will lend resilience to the composite plate 100 in order to resist peripheral forces in the direction of motion. If desired, any of plates 24, 26, 58 or 100 may be constructed of beryllium copper of suitable thickness to add to their resilience.

FIG. 3c illustrates another alternate form of moving plate 200 provided with a hollow, cone-shaped cap 201 tapering in the direction of motion. Such a plate 200 may be square-threaded onto the lower end of a rod 202 similar in construction and operation to the previously described exploder piston rods. Prior to positioning of cover or cap 201, the plate 200 may be secured by tightening the nut 204 on threaded stud 205 extending within the lower end of the piston rod 202. This entire assembly may be of lightweight aluminum, and the cap 201 may be filed with polyurethane foam 205 to further reduce its weight. These factors, together with the hydrodynamic streamlining of cone 201, enable a high acceleration of the plate 200 in relation to the chemical energy of explosion supplied. Therefore, such a plate produces an acceptable degree of cavitation even though it lacks the particular advantages ascribed to the configuration of FIG. 3a.

The foregoing is understood to be by way of illustration only. Those skilled in the art will have no difficulty in employing the inventive concepts disclosed herein in further modification of the specific features described and shown without departing from the scope of the invention as more particularly set forth in the appended claims.

The embodiments of the invention in which an exclusive property or privilege is claimed are defined as follows.

1. In a marine gas exploder utilizing an enclosed cylinder adapted to be supported in a submerged state, a piston movable therein, a piston rod extending from said piston through one end of said cylinder, and air spring means between said piston and said one end for biasing said piston away from said one end, the combination comprising:
   a. an annular plate mounted at the external end of said rod substantially surrounded by water, one surface of said plate being in facing relation to said one end, and unopposed by any other adjacent or contiguous surface of similar contour and extent; and
   b. means for explosively driving said piston in the direction of said one end to propel said annular plate through the water, the diameter of said plate being selected between limits such that the forward acceleration thereof is sufficient to induce substantial cavitation adjacent its trailing surface and the damped return thereof responsive to said air spring means is insufficient to produce substantial oscillation.

2. The combination claimed in claim 1 wherein said annular plate has a diameter of at least twice that of said cylinder.

3. Apparatus as in claim 1 wherein said plate has a concave-convex shape oriented so that its leading surface is concave.

4. Apparatus as in claim 1 wherein said plate elastically resists bending movements tending to deform its periphery forwardly in response to the collapse of said cavitation.

5. Apparatus as in claim 1 wherein the cylinder of said exploder is supported in a vertical direction.

6. Apparatus as in claim 1 wherein said cylinder of said exploder is held in a fixed position.

7. Apparatus as in Claim 1 wherein said plate consists of a plurality of circular laminations.

8. A marine gas exploder comprising in combination:
   a. an enclosed cylinder adapted to be supported in a submerged state;
   b. a pair of pistons movable within said cylinder and separated therein by an expansible combustion chamber;
   c. a pair of piston rods extending from the respective pistons through the opposite ends of the cylinder;
   d. air spring means within said cylinder between each of said pistons and said respective opposite ends of said cylinder for biasing said pistons away from said opposite ends;

e. a pair of annular plates mounted respectively at the external ends of said piston rods substantially surrounded by water, one surface of each of said plates being in facing relation respectively to said opposite ends of the cylinder and unopposed by any other adjacent or contiguous surfaces of similar contour and extent;

f. means for igniting an explosive gas mixture within said combustion chamber to drive said pistons apart, thereby propelling said pair of annular plates in opposite directions through the water, the diameter of said plates being selected between limits such that the forward acceleration thereof is sufficient to induce substantial cavitation adjacent their respective trailing surfaces and the damped return thereof responsive to said air spring means is insufficient to produce substantial oscillation.

* * * * *